July 3, 1962

C. B. BRAHM 3,042,872

TRANSISTOR DEMODULATOR

Filed March 4, 1959

INVENTOR
CHARLES B. BRAHM
BY Harris G. Luther
ATTORNEY

United States Patent Office 3,042,872

Patented July 3, 1962

3,042,872

TRANSISTOR DEMODULATOR

Charles B. Brahm, Rockville, Conn., assignor to United Aircraft Corporation, East Hartford, Conn., a corporation of Delaware Filed Mar. 4, 1959, Ser. No. 797,184

2 Claims. (Cl. 329—50)

This invention relates to demodulators and more particularly to a transistor demodulator which is responsive to the phase relationship between a modulated A.C. input signal and an A.C. reference signal.

In many situations, it is desirable not only to know that a deviation or error from a preselected condition of operation has occurred, but also to determine the amount and direction of the deviation. Thus, for example, in temperature control systems the amount of deviation of temperature from a preselected value is commonly indicated by modulating the amplitude of an A.C. carrier wave with an error signal from the temperature source; a temperature above the preselected value being indicated by a wave of a given phase and a temperature below the preselected value being indicated by a wave 180° out-of-phase with the the original wave.

It may be desired to utilize the modulated signal to perform some function only when the error occurs in one direction. For example, it may be desired to open a valve and allow cooler air to enter when a temperature above a preselected value is indicated, but to do nothing if a temperature below a preselected value occurs. Many devices for operating selectively on the modulated wave include complicated and costly networks employing demodulators for changing the amplitude modulated A.C. signal into a D.C. signal, amplifiers for amplifying the signal either before or after demodulation, and special circuits for sensing the phase of the modulated wave.

It is an object of the present invention to provide a simple and inexpensive demodulator which is sensitive to the phase of the modulated wave.

Another object of the present invention is to provide a simple and inexpensive demodulator which will supply a substantial amount of gain.

A further object of the present invention is to provide a phase sensitive demodulator which requires few component parts.

In accordance with the present invention, semi-conductive elements are employed in the circuit that is designed to avoid components which are bulky and which give off excessive heat.

The present invention essentially consists in providing a transistor which is biased at its collector by a constant amplitude A.C. reference signal of the same frequency as the amplitude modulated input signal so that the transistor will conduct only when the two A.C. signals are essentially in phase. A diode can be provided in the transistor collector circuit to prevent reverse current flow, while the load is inserted in the transistor emitter-collector circuit where current will flow only when the transistor is conducting. The current flow in the load is proportional to the A.C. input signal, thus providing the required demodulation, and the D.C. output is taken across the load. The transistor will supply a substantial amount of gain to the system.

One transistor can be employed to furnish a half-wave rectified signal of one polarity, or two transistors may be employed to give a reversible polarity half-wave signal or a full-wave output of one polarity or of reversible polarity.

Other objects and a fuller understanding of the invention may be had by referring to the following description and claims taken in conjunction with the accompanying drawings in which:

Figure 1:
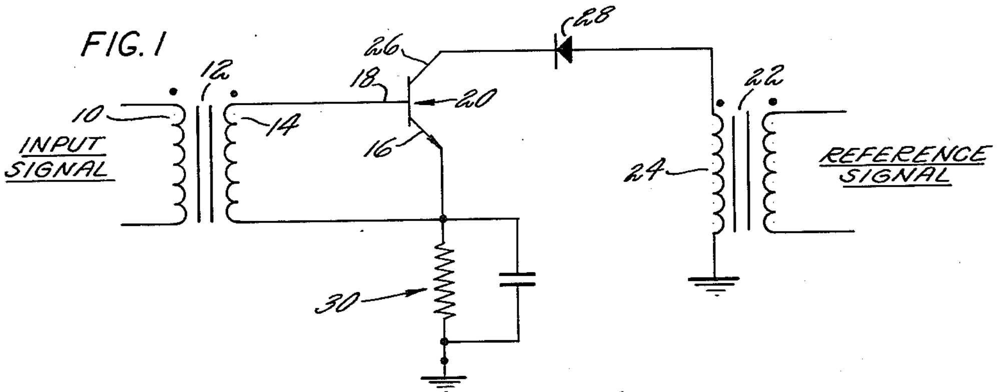
FIG. 1 is a schematic wiring diagram of the demodulator using one transistor for half-wave rectification of one polarity.

Referring to FIG. 1, an amplitude modulated A.C. input signal is received from primary winding 10 of transformer 12, and is fed from secondary winding 14 across the emitter 16 and base 18 of transistor 20. A constant amplitude A.C. reference signal of the same frequency as the input signal is continuously supplied through transformer 22, and secondary winding 24 applies the reference signal to collector 26 of transistor 20. Diode 28 is inserted in the circuit between collector 26 and secondary winding 24 and will permit current to flow to collector 26 only during the positive half-cycle of the A.C. reference signal. Load 30 is inserted in the circuit between emitter 16 and ground, but it is obvious that the load can be placed anywhere in the emitter-collector circuit with the same results.

In order to supply current through the transistor, it is necessary that there be positive bias on the collector 26. Because of diode 28, a collector bias will be supplied only during alternate half-cycles of the reference signal while during the other half-cycles, collector 26 will have a zero voltage. If the A.C. input signal, which is of the same frequency as the reference signal, is in phase with the reference signal, the emitter-base junction of transistor 20 will be forward biased at the same time that the collector 26 is at a positive potential because of the reference signal, and the transistor will conduct in the normal manner. The flow of current through load 30 will be proportional to the flow of current in base 18, and therefore the D.C. voltage across the load will be proportional to the A.C. signal applied from the emitter 16 to the base 18.

If the A.C. input signal is 180° out-of-phase with the A.C. reference signal, the emitter-base junction of transistor 20 will be forward biased when collector 26 has a zero voltage applied to it, and will be reverse biased when collector 26 is positive. In either case, no current will flow to load 30.

Figure 2:
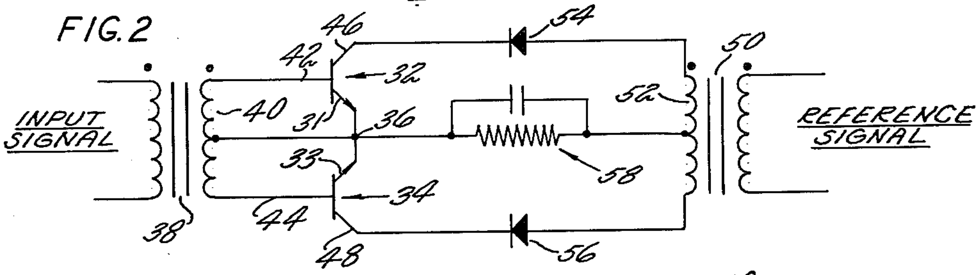
FIG. 2 is a schematic wiring diagram of the demodulator using two transistors for full-wave rectification of one polarity.

FIG. 2 shows the connection for a full-wave output. Two transistors 32 and 34 are connected so that their emitters 31 and 33 are joined at junction 36. The amplitude modulated input signal is applied through transformer 38 and center-tapped secondary winding 40 to bases 42 and 44, the center tap being connected to junction 36. A constant amplitude reference signal of the same frequency as the input signal is connected to collectors 46 and 48 through transformer 50 and center-tapped secondary winding 52. Diodes 54 and 56 are inserted between collectors 46 and 48 and secondary winding 52 in the direction of transistor conduction. A load 58 is inserted in the emitter-collector circuit between junction 36 and the center tap of secondary winding 52.

When the input signal is in phase with the reference signal, the base-emitter junction of one of the transistors will be forward biased at the same time that the transistor collector is positive as a result of the reference signal. For example, when base 42 receives a positive signal from the input, junction 36 will be more negative than base 42 and the emitter-base junction of transistor 32 will be forward biased. If, at the same time, collector 46 is at a positive potential, transistor 32 will conduct and output current will flow through load 58. If the reference signal is out-of-phase, collector 46 will be at zero potential and no current will flow through transistor 32.

During the next half-cycle of operation, base 44 will swing positive and base 42 negative, forward biasing transistor 34 and reverse biasing transistor 32, and current will flow through transistor 34 if collector 48 is at a positive potential. Conversely, if the reference signal is not in phase with the input signal, collector 48 will be at zero potential and transistor 34 will not conduct current through load 58.

It can thus be seen that when the signals are in phase, transistors 32 and 34 will conduct alternately during each half-cycle, resulting in a full-wave output, while when the two signals are not in phase, neither transistor can be rendered conductive and there will be no output.

Figure 3:
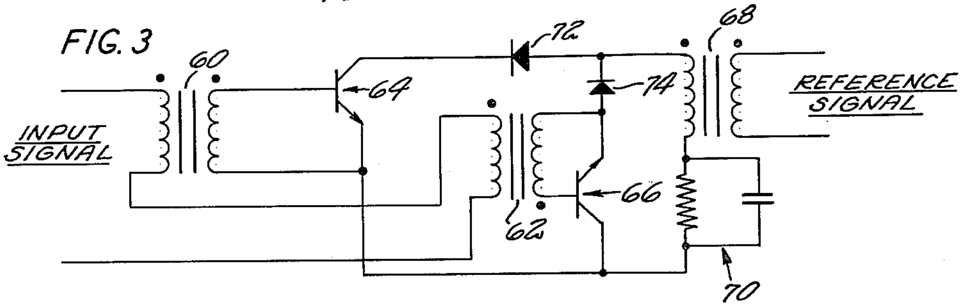
FIG. 3 is a schematic wiring diagram of the demodulator using two transistors for half-wave rectification of reversible polarity.

In FIG. 3 two transistors are connected across the reference signal so as to conduct in opposite directions. The input signal will be supplied to transformers 60 and 62 so as to supply a bias to the emitter base junctions of transistors 64 and 66, respectively. The constant amplitude A.C. reference signal is applied through transformer 68. Load 70 is in series with the reference signal supply. Diodes 72 and 74 are connected in series with each transistor. When the input signal and reference signal are in phase, the emitter base junction of transistor 64 will be forward biased by the input signal and the collector of transistor 64 will receive a positive signal from the reference signal supply through diode 72, thus rendering transistor 64 conductive. The output current will flow through load 70 and will be proportional to the input signal. At the same time the emitter base junction of transistor 66 will also be forward biased but the collector of transistor 66 will be at a negative potential because of the reference signal and diode 74 will be reverse biased so that transistor 66 will not conduct. During the next half-cycle, the emitter base junctions of both transistors will be reverse biased and neither transistor will conduct.

When the input signal is out-of-phase with the reference signal, at the time that the emitter base junctions of transistors 64 and 66 are forward biased, the reference signal will be of a polarity so that the collector of transistor 66 will be positive while the collector of transistor 64 will be zero because of diode 72. Transistor 66 will now conduct while transistor 64 cannot conduct because of the zero voltage on the collector of transistor 64. The current now flowing through load 70 will be in the opposite direction from the current supplied by transistor 64. During the next half-cycle of operation, neither transistor will conduct, again because of a reverse bias on their emitter base junctions.

The output from this circuit will thus be a half-wave signal with the polarity dependent on the phase relationship between the input signal and the reference signal.

Figure 4:
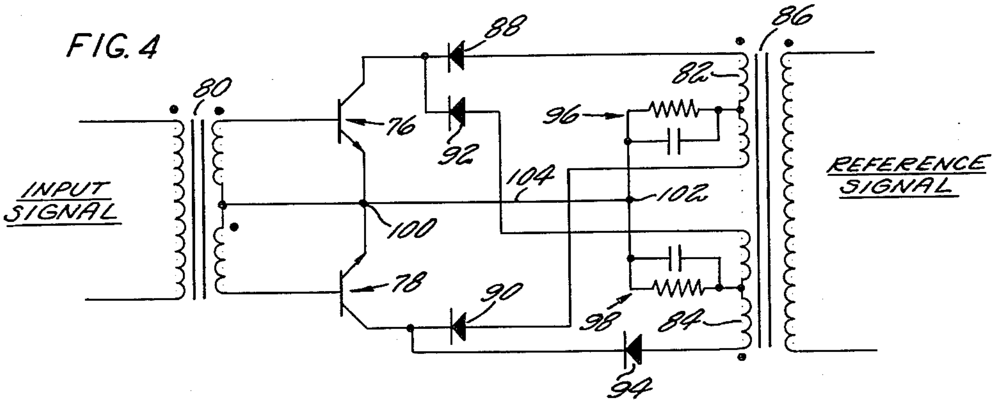
FIG. 4 is a schematic wiring diagram of the demodulator using two transistors for a reversible polarity full-wave output.

In FIG. 4 the input signal is applied to the emitter base junctions of transistors 76 and 78 through transformer 80. The reference signal is applied to two split secondary windings 82 and 84 through transformer 86, the polarity of the secondary windings being opposite as shown in FIGURE 4. Each secondary winding is connected across transistors 76 and 78 so that both ends of each secondary winding are connected to the collectors of the transistors. For example, one end of secondary winding 82 is connected through diode 88 to the collector of transistor 76, while the other end of secondary winding 82 is connected through diode 90 to the collector of transistor 78. Likewise, the ends of secondary winding 84 are connected through diodes 92 and 94 to the collectors of transistors 76 and 78, respectively. A split load 96 and 98 is placed in the circuit between the midpoints of secondary windings 82 and 84. The circuit is completed by joining the junction point 100 of the emitters of transistors 76 and 78 to the midpoint 102 of split load 96 and 98 by line 104.

When the input signal is in phase with the reference signal, during the first half-cycle, transistor 76 will be forward biased while transistor 78 will be reverse biased. Secondary winding 82 will supply a positive voltage to the collector of transistor 76 through diode 88 so that transistor 76 will now conduct and supply current to load 96. The reverse bias on transistor 78 will render it nonconductive regardless of its collector voltage. During the next half-cycle of operation, transistor 78 will become forward biased and winding 82 will supply a positive potential to the collector of transistor 78 through diode 90, and transistor 78 will conduct. The path of conduction in this case will be through line 104, load 96, the bottom half of secondary winding 82, diode 90 and back to transistor 78. The direction of current flow through load 96 will be in the same direction as during the previous half-cycle of operation.

When the reference signal is out-of-phase with the input signal, at the time that transistor 76 is forward biased, the collector of transistor 76 will be at a positive potential, but now because of the flow from secondary winding 84 through diode 92. Transistor 76 will conduct, the path being through line 104, load 98, the top half of secondary winding 84 and diode 92. At this time transistor 78 will be reverse biased and therefore non-conductive.

During the next half-cycle, transistor 78 will be forward biased and secondary winding 84 will supply a positive voltage to the collector of transistor 78 through diode 94, and transistor 78 will conduct through load 98. Transistor 76 will be non-conductive at this time. It should be noted again that the current through load 98 is in the same direction regardless which transistor is conducting.

FIG. 4 thus describes a two-transistor demodulator which will give a full-wave output whose polarity is dependent on the phase relationship between the input signal and the reference signal.

What has been described is a demodulator requiring few component parts and utilizing semi-conductive components resulting in low heat dissipation. The demodulator also has the advantage of being sensitive to the phase relationship between the amplitude modulated input signal and a constant amplitude reference signal of the same frequency. The demodulator can supply either half-wave or full-wave rectification of one polarity or of reversible polarity to the modulated input signal, and will also supply a substantial amount of gain to the system.

Although the invention has been described with a certain degree of particularity, it is to be understood that the present disclosure has been made only by way of example and that numerous changes in the detail of construction and the combination and arrangement of parts may be resorted to without departing from the spirit and scope of the invention as hereinafter claimed.

What is claimed is:

1. In a demodulator, in combination, means to supply a constant amplitude alternating reference voltage, first and second transistors of the same conductive type, each transistor having an emitter, base and collector, means connecting the emitter and collector of each transistor in parallel across said reference voltage supply means, the emitter of one transistor being connected to the collector of said other transistor, means to supply a variable amplitude alternating signal voltage across the emitter and base of each transistor simultaneously, said alternating signal voltage being of the same frequency as said reference voltage, and a load in series with said reference voltage supply means, one of said transistors conducting and supplying to said load a first output signal of one polarity proportional to said signal voltage when said signal voltage is substantially in phase with said reference voltage, the other of said transistors conducting and supplying to said load a second output signal proportional to said signal voltage with a polarity opposite said first output signal when said signal voltage is substantially 180° out of phase with said reference voltage.

2. In a demodulator, in combination, first and second transistors of the same conductive type each having an emitter, base and collector, a source of constant amplitude alternating reference voltage, means connecting the emitter and collector of said first transistor across said reference voltage source, a diode between said first transistor collector and said reference voltage source and connected in the direction of conduction of said first transistor, means connecting the emitter and collector of said second transistor across said reference source, said second transistor being positioned to conduct in a direction opposite the direction of conduction of said first transistor, a diode between the emitter of said second transistor and said reference voltage source and connected in the direction of conduction of said second transistor, means to supply a variable amplitude alternating signal voltage of the same frequency as said reference voltage to the emitter and base of both said transistors simultaneously, and a load in series with said reference voltage source, said first transistor conducting and supplying a first direct current output signal of one polarity proportional to said signal voltage to said load during alternate half-cycles when said signal voltage is substantially in phase with said reference voltage, said second transistor conducting and supplying a second direct current output signal proportional to said signal voltage to said load with a polarity opposite said first output signal during alternate half-cycles when said signal voltage is substantially out of phase with said reference voltage.

References Cited in the file of this patent

UNITED STATES PATENTS

| | | |
|---|---|---|
| 2,597,886 | McCoy | May 27, 1952 |
| 2,820,143 | D'Nelly et al. | Jan. 14, 1958 |
| 2,827,611 | Beck | Mar. 18, 1958 |
| 2,900,506 | Whetter | Aug. 18, 1959 |
| 2,941,093 | Merel | June 14, 1960 |

OTHER REFERENCES

"Using Transistors in Demodulator Circuits," A. N. De Sautels, Electronic Design, Part I; May 28, 1958, pp. 24–27, and Part II; June 11, 1958, pp. 52 to 55.